(12) United States Patent
Cher et al.

(10) Patent No.: US 8,892,921 B2
(45) Date of Patent: *Nov. 18, 2014

(54) POWER MANAGEMENT FOR SYSTEMS ON A CHIP

(75) Inventors: Chen-Yong Cher, Yorktown Heights, NY (US); Tejas S. Karkhanis, White Plains, NY (US); Srinivasan Ramani, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/553,469

(22) Filed: Jul. 19, 2012

(65) Prior Publication Data

US 2012/0284542 A1    Nov. 8, 2012

Related U.S. Application Data (63) Continuation of application No. 12/700,513, filed on Feb. 4, 2010, now Pat. No. 8,312,305.

(51) Int. Cl.
  *G06F 1/32*    (2006.01)
  *G06F 1/00*    (2006.01)

(52) U.S. Cl.
  CPC ............... *G06F 1/00* (2013.01); *Y02B 60/1214* (2013.01)
  USPC ........................... 713/320; 713/300; 713/322

(58) Field of Classification Search
  None
  See application file for complete search history.

(56) References Cited

U.S. PATENT DOCUMENTS

| | | | |
|---|---|---|---|
| 6,834,353 B2 | 12/2004 | Smith et al. | |
| 7,337,339 B1 | 2/2008 | Choquette et al. | |
| 2007/0198863 A1 | 8/2007 | Bose et al. | |
| 2009/0199020 A1* | 8/2009 | Bose et al. | 713/300 |
| 2009/0313592 A1 | 12/2009 | Murali et al. | |
| 2010/0011530 A1 | 1/2010 | Kunz et al. | |

* cited by examiner

*Primary Examiner* — Dennis M Butler
(74) *Attorney, Agent, or Firm* — F. Chau & Associates, LLC; William J. Stock, Esq.

(57) ABSTRACT

A method for controlling a multitasking microprocessor system includes monitoring the multitasking microprocessor system connected to an interconnect, the monitoring comprising monitoring performance of a plurality of processing units forming a producer-consumer system on the interconnect, and issuing commands to the plurality of processing units to provide operations and power distributions to the plurality of processing units such that the performance and power modes are assigned to the plurality of processing units based on the monitoring.

10 Claims, 6 Drawing Sheets

Task K
Task L
Task M
...

Ak
Gbps

Bk
Gbps

Ck
Gbps

Dk
Gbps

Ak/N1
Gbps

Bk/N2
Gbps

Ck/N3
Gbps

Dk/N4
Gbps

POWER MANAGEMENT FOR SYSTEMS ON A CHIP

CROSS-REFERENCE TO RELATED APPLICATION

This is continuation application of U.S. application Ser. No. 12/700,513, filed Feb. 4, 2010, the disclosure of which is herein incorporated by reference in its entirety.

BACKGROUND

1. Technical Field

The present invention relates generally to power management. More particularly, this invention relates to controlling power and performance in a hybrid, multitasking microprocessor system.

2. Discussion of Related Art

In a homogeneous chip-multiprocessor such as POWER6, because the processing elements have similar capabilities and power/performance trade-offs, management can be individually performed with the same algorithm for each processing element.

In a hybrid computing where there are different processing elements, each target is a special purpose/function (e.g., XML, Crypto, massively threaded) having different power/performance trade-offs (e.g., in-order vs. out-of-order, single-thread optimized vs. throughput optimized). The processing elements of a hybrid chip-multiprocessor share resources, such as a common power/thermal budget, on-chip caches and bandwidth, and can have multiple applications running concurrently where each application or task may utilize multiple special-purpose processing elements in sequential or concurrent ordering. Since the processing elements (hereinafter abbreviated as PE) of a hybrid chip-multiprocessor share resources, the conventional power managing (e.g., clock frequency/voltage scaling) decisions that optimize independently for individual PE, or decisions that optimize for all PEs on the chip without considering inter-dependent relationships, result in processing capabilities unique to each PE that are not optimal for the entire hybrid chip-multiprocessor.

In the context of a hybrid, multitasking microprocessor system, a task spans multiple accelerators, which can be compress, xml, crypto, packet processing, etc. in a specific ordering. Unlike a pipeline for micro- or graphics processor, the ordering may be different for each task.

In view of the foregoing, a need exists for a system and method of power management in a hybrid, multitasking microprocessor system.

BRIEF SUMMARY

According to an embodiment of the present disclosure, a system for controlling a multitasking microprocessor system includes an interconnect, a plurality of processing units connected to the interconnect forming a single-source, single-sink flow network, wherein the plurality of processing units pass data between one another from the single-source to the single-sink, and a monitor connected to the interconnect for monitoring a portion of a resource consumed by each of the plurality of processing units and for controlling the plurality of processing units according to a predetermined budget for the resource to control a data overflow condition, wherein the monitor controls performance and power modes of the plurality of processing units.

According to an embodiment of the present disclosure, a method for controlling a multitasking microprocessor system includes monitoring the multitasking microprocessor system connected to an interconnect, the monitoring comprising monitoring a plurality of processing units forming a producer-consumer system on the interconnect, and issuing commands to the plurality of processing units to provide operations and power distributions to the plurality of processing units such that performance and power modes are assigned to the plurality of processing units based on the monitoring.

According to an embodiment of the present disclosure, a computer program product for controlling a multitasking microprocessor system, the computer program product includes a computer readable storage medium having computer readable program code embodied therewith, the computer readable program code including computer readable program code configured to monitor the multitasking microprocessor system connected to an interconnect, the monitoring comprising monitoring a plurality of processing units forming a producer-consumer system on the interconnect, and computer readable program code configured to issue commands to the plurality of processing units to provide operations and power distributions to the plurality of processing units such that performance and power modes are assigned to the plurality of processing units based on the monitoring.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, a method for controlling power and performance in a microprocessor system monitors and uses producer-consumer relationships among tasks and special-purpose processors. An exemplary microprocessor system can be implemented in server or embedded systems such as networking, graphics, handheld and communication chips.

According to an embodiment of the present disclosure, a method of power management in a hybrid, multitasking microprocessor system can achieve performance/power/thermal operating points, by monitoring performance-related activities based on workloads, thermal, power and relationship between processing elements to compute and apply throttling, by means of reducing clock-frequency/voltage or activities, of each processing element. Ordering and communication relationships between processing elements are leveraged for a special-purpose system-on-a-chip for hybrid computing. The power management has a global and accurate view of the applications and can reduce power while achieving higher performance within power/thermal budgets while meeting performance requirements.

Figure 1:
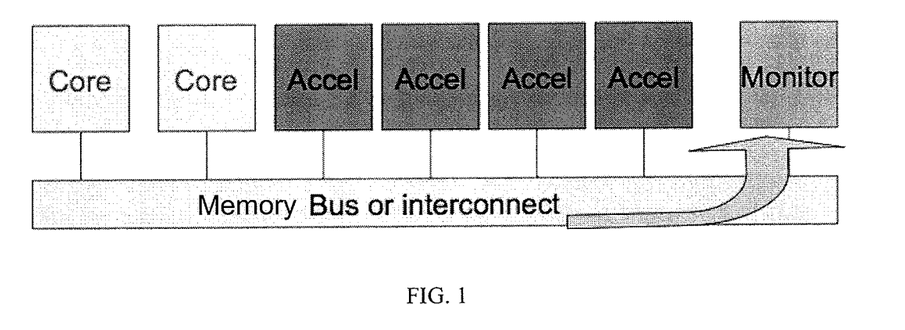
FIG. 1 is an diagram of a device comprising special-purpose systems on chip, according to an embodiment of the present disclosure.

According to an embodiment of the present disclosure, the microprocessor system, a hybrid, multitasking microprocessor system, as shown in FIG. 1, processes each task through a series of special-purpose processing units. The units can have different processing rates and each unit has a set of modes that can individually trade off power/performance. The monitoring and control system includes a plurality of monitoring mechanisms for performance and power, and a monitor of producer-consumer relationships among tasks. The method coordinates and regulates the power modes among the units by leveraging producer-consumer and resource dependencies to achieve various levels of power/performance. For example, the method can reduce total system power, or reduce local hotspots on particular a unit, or improve performance by reducing spilling of cache data in some cases.

Methods of performing point-to-point or a shared bus communication are generic. Power management is provided for the cases where the same program uses different cores, and consequently the user must observe a sequential execution. Different cores execute different threads. There is no requirement of a particular sequence between the operations on various cores. Dependence information of the running program is not provided.

Table 1 is an exemplary task/performance description table for different tasks and associated sequences.

TABLE 1

| Task/Performance Description Table | | | |
| --- | --- | --- | --- |
| Task | Sequence | Target Throughput | Target Max Delay |
| T1 | ABD | — | 10 ms |
| T2 | ACD | 20 GB/sec | — |
| T3 | CBD | — | 40 ms |

Figure 2:
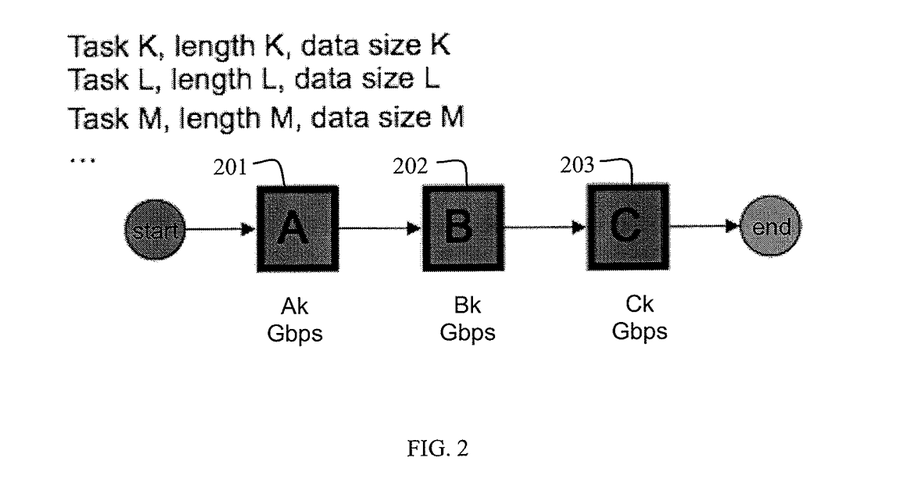
FIG. 2 illustrates a task through a series of special-purpose processing units according to an embodiment of the present disclosure.

Referring to FIG. 2, in a system where a task progresses through a series of PEs or special-purpose processing units 201-203, where the units can have different processing rates, each unit has a set of modes (e.g., frequency and voltage) that can trade off different power/performance. An example of special-purpose processing units different processing rates can be exemplified by a cryptography unit, wherein latency varies with key size and algorithm and units communicate by fixed-size buffer or memory buffers/caches. According to an embodiment of the present disclosure, the power modes among the units are coordinated/regulated by leveraging their producer-consumer relationships to achieve various power/performance goals. According to an embodiment of the present disclosure, a method can reduce total system power, or reduce local hotspots on a particular unit, or improve performance by reducing spilling of cache data. As a special case, the method considers the memory bus as a special PE to regulate power and bandwidth.

When the environment changes such that all units have lower their processing speed power can be saved. Uncoordinated power management affects system performance negatively. For example, consider if only C 203 reduces its frequency to meet a power budget, then A 201 and B 202 would be consuming excess power by operating at frequencies in excess of the capabilities of C 203. According to an embodiment of the present disclosure, all units slow down in a balanced matter such that the data flow between units are of a size that substantially prevents data from spilling to memory (e.g., in a case using caches).

While treating each PE the same can result in some benefit, it may not be optimal to slow down every PE's clock frequency by the same factor. For example, since ordering can be complex like a forest (e.g., in the sense of graph theory) and power is a function of the PE's workload in addition to the PE's clock frequency, PEs can be individually controlled to achieve an optimal power/performance trade-off through.

Figure 3:
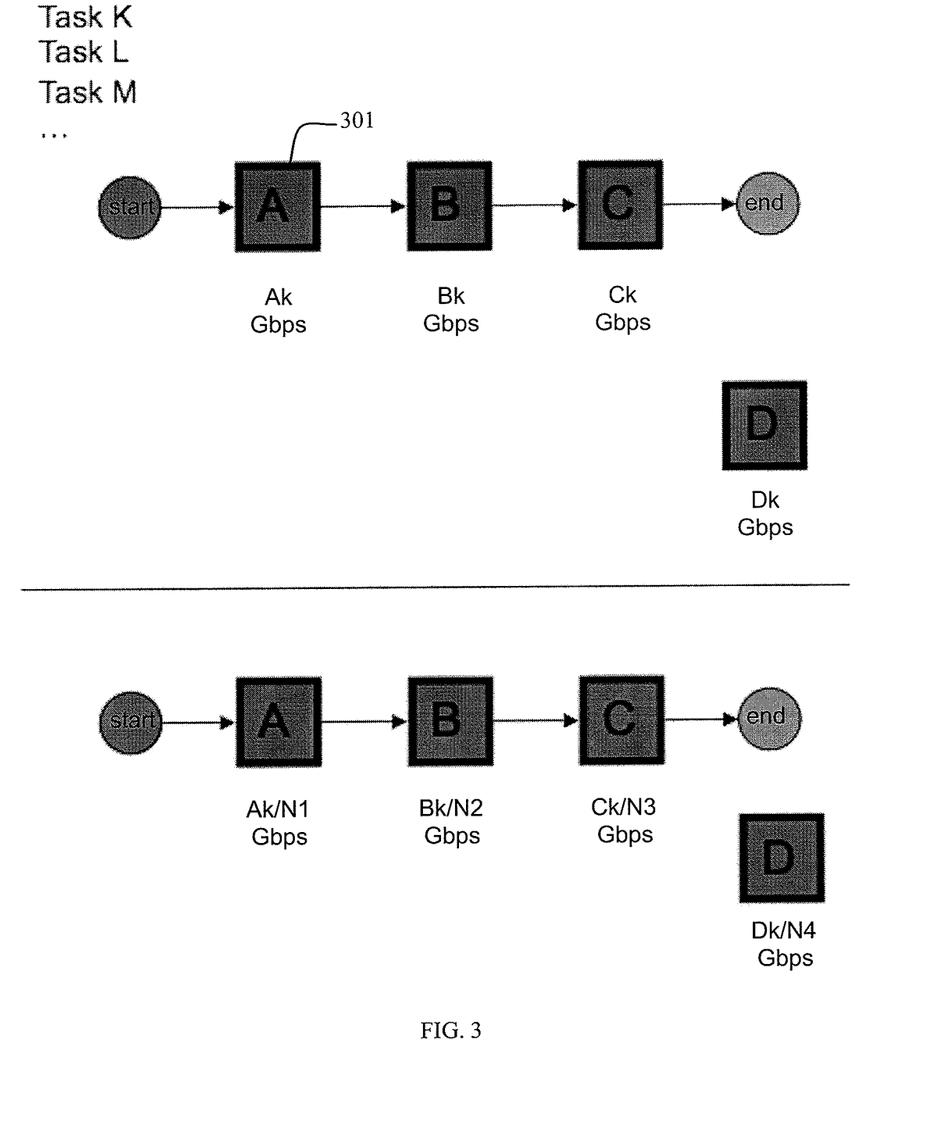
FIG. 3 illustrates a task through a series of special-purpose processing units according to an embodiment of the present disclosure.

Referring to FIG. 3, a problem may occur when one or more nodes experience a temperature increase relative to other nodes. According to an embodiment of the present disclosure, nodes can be slowed prior to the experiencing the temperature increase. Nearby nodes, e.g., 301, can also be slowed to cool off a hot spot. Each node slows down by an individual speed-dividing factor.

Figure 5:
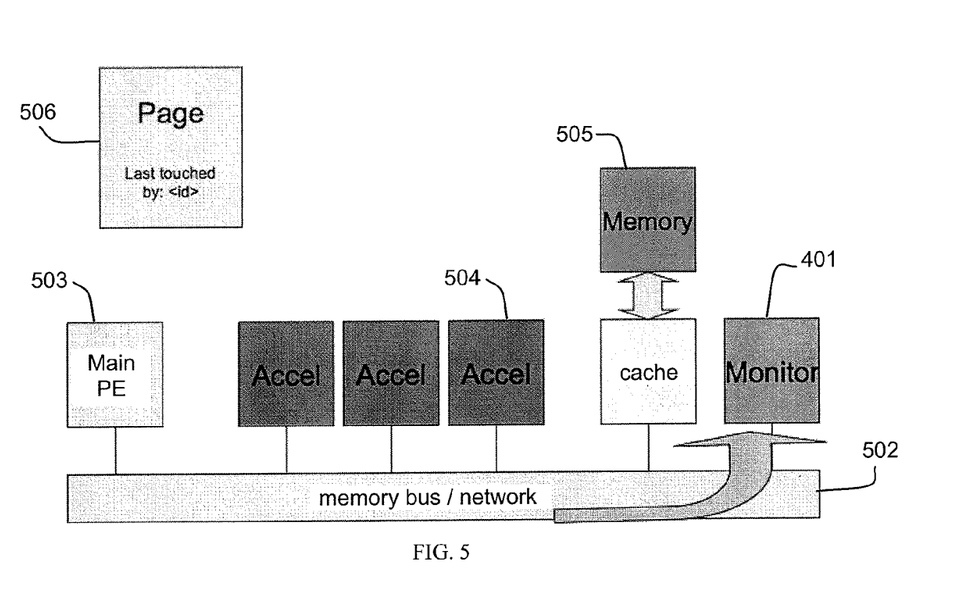
FIG. 5 is an diagram of a device comprising special-purpose systems on chip having monitor memory region, according to an embodiment of the present disclosure.

Referring to FIG. 2, in a system where the frequency is set by monitoring the relationship between the processing capability (frequency) and the actual work done (e.g., instruction-per-cycle or effective processing rate), if B 202 spills to memory, causing C 203 to slow its frequency and save power such that C 203 receives tasks from B 202 at a lower frequency, then the spilling will increase and C 203 will remain in a low frequency condition. In FIG. 5 the transaction monitor 401 observes that data produced by B 202 are often spilled to the memory and then brought back in by C 203, and adjusts the frequency or processing rate of B 202 and C 203 according to the cache usage/capacity to substantially prevent further spilling.

In conventional hybrid systems, a main PE retries its request if a consuming accelerator rejects the main PE's requests, resulting in waste of bus bandwidth and power. The method throttles main PE's request rate and therefore number of retries to save bus bandwidth and power.

According to an embodiment of the present disclosure, transaction monitors are used for task specific system usage and ordering between accelerators, cache misses of each accelerator, and memory dependences between them, power, thermal and performance of each accelerator, and the processing rate of each accelerator.

Figure 4:
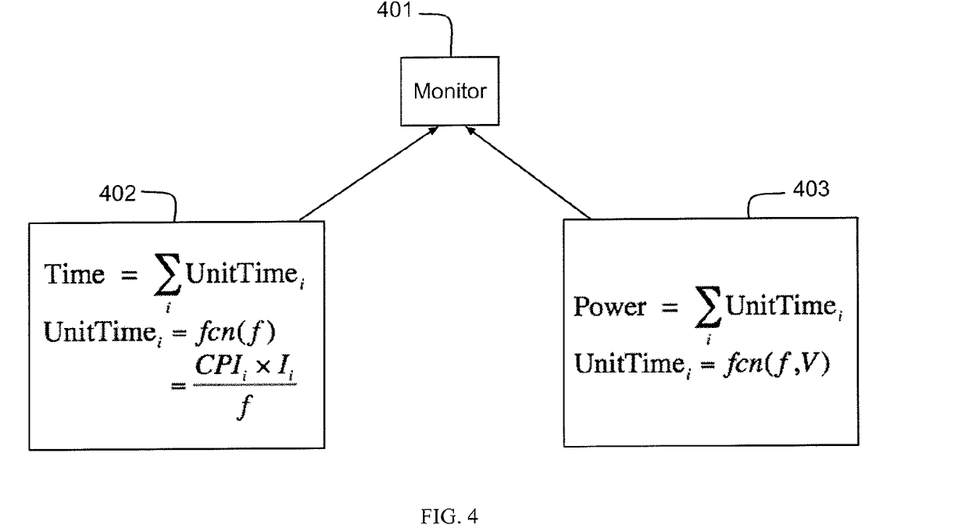
FIG. 4 illustrates a linear optimizer having thermal and hot signature interrupts according to an embodiment of the present disclosure.

Referring to FIGS. 4-5, a transaction monitor 401 will observe thread specific system usage by snooping the network 502. The interaction pattern between units is tracked by monitoring bus commands. A main PE 503 that initiates requests to use other accelerator PEs emits bus commands representing "accelerator start" commands. These bus commands contain fields that identify the main PE and the specific thread within the main PE that issues the command. These accelerator start commands can be snooped by the monitor 401 and recorded along with a time-stamp. The bus commands that an accelerator 504 emits when it acknowledges acceptance of the accelerator start command, and when it indicates completion of processing are also snooped by the monitor 401, time-stamped, and recorded. The acknowledgement and completion bus commands from the accelerator contain fields that identify the accelerator, as well as the main PE that has to be notified. The monitor can use the identifying fields in the recorded bus commands from the main PE and the accelerators to create the work flow graph. The timestamps allow it to compute the rate of generation of accelerator start commands, and processing latencies at the accelerators. Note that although the above explains interaction between a main PE and an accelerator PE, it is also possible for two main PEs, or two accelerator PEs to interact in the manner described above. In other words, a main PE can initiate processing on another main PE or an accelerator PE. Likewise, an accelerator PE can indicate completion to a main PE when done, or initiate additional processing on another main PE or accelerator PE.

The monitor 401 finds an optimal frequency and voltage via linear programming optimization.

FIG. 4 illustrates an example of a specialized linear optimizer. In FIG. 4, fcn denotes a function, f denotes frequency, V denotes voltage, CPI denotes cycle-per-instruction, $I_i$ denotes a number of instructions for unit i. The specialized linear optimizer can be always on or triggered. Triggers can include, for example, a thermal interrupt or hot signature interrupt. Exemplary optimization functions minimize power while achieving minimum required performance (constraint) 402 and maximize performance while not exceeding specified power—global or local (constraint) 403.

A monitor memory region 505 recognizes memory dependence between accelerators. The monitor records a last touch unit <id> 506 at the page granularity. The monitor 401 observes the last touch <id> on the network 502, memory bus, interconnect, etc.

According to an embodiment of the present disclosure, a system can be expressed in Little's Law from the Queuing Theory, N=LT, where N is a buffer size, L is an incoming rate of amount of data and T is a service time (cycles/frequency). The system can be manipulated with the iterative max-flow algorithm. According to an embodiment of the present disclosure, the performance (e.g., throughput) of a system within a certain power budget is maximized by applying the max-flow algorithm iteratively. It should be appreciated that the max-flow algorithm may be replaced with a min-flow algorithm according to a desired application.

Figure 6:
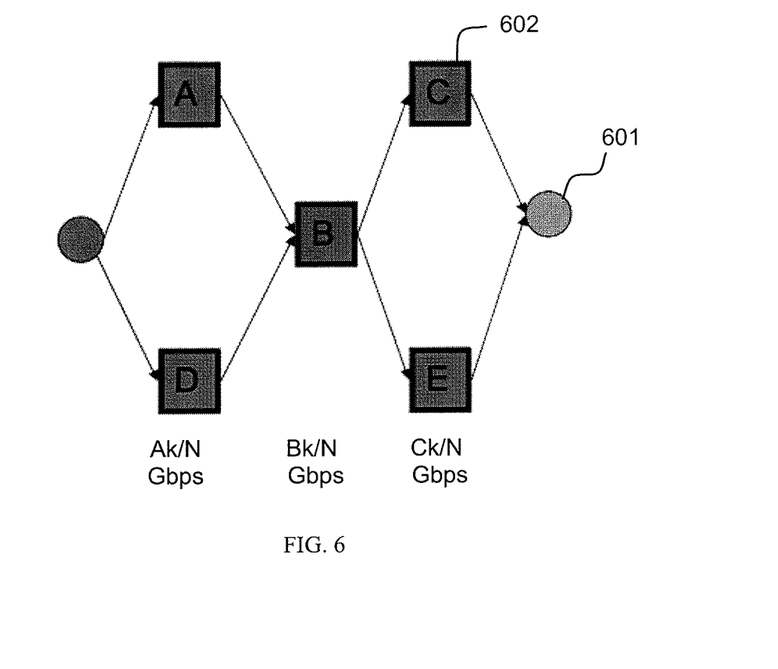
FIG. 6 illustrates a task through a parallel arrangement of special-purpose processing units according to an embodiment of the present disclosure.

It should be noted that PEs may be arranged in series or parallel (see FIGS. 3 and 6, respectfully).

Referring to FIG. 6 for example, by applying an iterative max-flow, N=LC/F can be reduced at an end node 601. For example, in a case where node C 602 is hot (e.g., as compared to a certain heat threshold), a frequency of node C can be reduced (e.g., from 1 Ghz to 0.5 Ghz) and an iterative max-flow algorithm can be applied to slow nodes A and B to improve performance and save power (the max-flow algorithm is a known method for finding a maximum feasible flow through a single-source, single-sink flow network). Node E can also be slowed because it's close to C, where the proximity of nodes to one another is known. Whether a node is close to another node can be predetermined.

Using the same method N=LC/F, a miss rate can be reduced instead of power. Actual performance can be predicted by the miss rate. For example, by fixing N, off-chip misses can be reduced.

Figure 7:
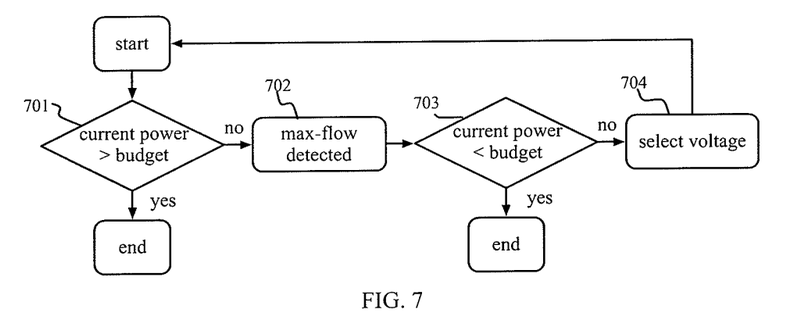
FIG. 7 is flow chart for controlling power and performance in a hybrid, multitasking microprocessor system, according to an embodiment of the present disclosure.
Figure 8:
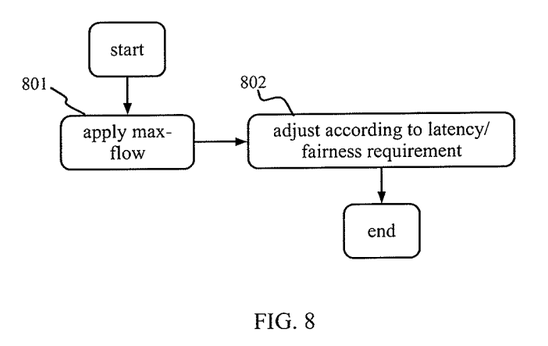
FIG. 8 is flow chart for controlling power and performance in a hybrid, multitasking microprocessor system under a max-flow condition, according to an embodiment of the present disclosure.
Figure 9:
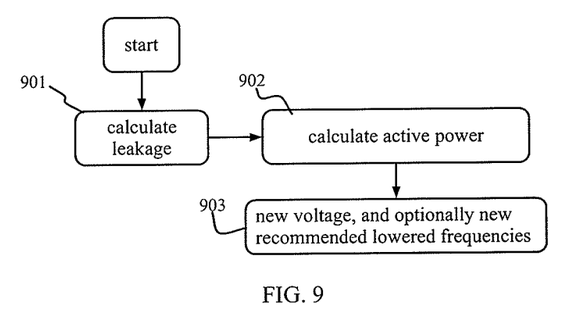
FIG. 9 is flow chart for controlling power and performance in a hybrid, multitasking microprocessor system based on a calculated leakage, according to an embodiment of the present disclosure.

FIGS. 7-9 illustrate a method for controlling power and performance in a hybrid, multitasking microprocessor system, according to an embodiment of the present disclosure. According to an embodiment of the present disclosure, the method adjusts the operating voltage or frequency if either the current performance is below the budget or if the current power is above the power budget. For example, at block 701, a current level of performance or current power is compared to a budget.

Table 2 is an example of target max leakage power, a component of power calculations that depends on voltage. Table 2 is a lookup table of leakage power for each PE, used by the method (see block 901 of FIG. 9) to make decisions on which voltage and frequency to use for each PE. Table 2 shows the voltage and frequency for each node in order to achieve a target leakage power (e.g., 15 W and 9 W). For the 15 W example, Table 2 indicates that that node A can operate at clock frequency of 2 Ghz and voltage (VDD) of 1.00 Volts consuming 4 Watts of leakage power, node B and C are also interpreted in the similar manner. The table can be made during manufacturing through characterizations, or during run time through profiling. The table also implicitly reflects certain properties of the PE relationships, such as manufacturing variation, thermal-leakage dependencies or if the PEs have to operate on the same voltage island or same clock-grid.

TABLE 2

Voltage Power Mode Table

| Targeted Max Leakage Power | VDD | A | B | C |
|---|---|---|---|---|
| 15 W | 1.00 | 2 Ghz/4 W | 5 Ghz/6 W | 1 Ghz/5 W |
| 9 W | 0.88 | 1.8 Ghz/2 W | 4.5 Ghz/4 W | 1 Ghz/3 W |

Table 3 is an accelerator description table, describing the clock frequency capability of each PE. According to an exemplary embodiment of the present disclosure, the method uses Table 2 and Table 3 to calculate active power based on the frequency, voltage and workloads in block 902 as shown in FIG. 9. Table 3 can be further extended to describe other limitations such as what frequencies are allowed or to reflect relative frequencies between PEs (e.g., if they share the same clock-grid).

TABLE 3

Accelerator description table

| Node | Maximum Frequency | Minimal Frequency Requirement (unless shut-off) |
|---|---|---|
| A | 2 Ghz | 0.5 Ghz |
| B | 4 Ghz | 0.4 Ghz |

At block 702, if the current budget is not greater than the budget a max-flow condition is detected. Referring to FIG. 8, given a voltage configuration, the max-flow is applied 801 to select a frequency for each node 802, e.g., according to a predetermine method, such as latency or fairness.

At block 703, the current level of performance is again compared to the budget or target.

At block 704, if the current budget is not greater than the budget a voltage is selected from a node table (see also FIG. 9). Referring to FIG. 9, leakage is calculated or determined at block 901 and an active power is calculated or determined at block 902. A new voltage is determined at block 903.

Table 4 shows an example of monitor 401 in FIG. 5, which monitors the memory bus/network on the number of reads and writes to a page (e.g., range of memory 505) over a period of time.

TABLE 4

Cache/Memory Reuse Monitoring

| Page | A | B | C |
|---|---|---|---|
| 0X10000000 0X10010000 | N reads | N Writes | N reads |

Table 5 describes the input and output to the method. Each row A-E describes the states of a PE. The header "to" and "from" fields describe the producer-consumer relationship of the PEs and can used to construct graphs similar to FIG. 6. The header "F" and "V" describe the current frequency and voltage, respectively. "L", "C" and "N" are current states of the PEs m the Little's Law equation N=LC/F, described herein. "Miss rate" describes the number of cache misses over time or number of events (e.g., instructions committed), and can be calculated from Table 4. "Temp" reflects the current temperatures of each PE as measured by temperature sensors or other means, used to compute leakage power. "LC/F" is the computation of the Little's Law using the current states of "L", "C" and "F". By constructing the graphs and applying the max-flow algorithm iteratively, the method computes the new "Balanced LC/F" that meets performance and power targets and determines the new frequencies (or power modes) from the new "Balanced LC/F" for each PE, and the new voltages needed for the new frequencies.

TABLE 5

Monitoring Table (C also changes with selected function within node)

| | to | from | F | V | L | C (cache hit) | C (all cache miss) | Miss rate | N | Temp | LC/F | Balanced LC/F | New F |
|---|---|---|---|---|---|---|---|---|---|---|---|---|---|
| A | B | Source | 1 Ghz | 0.8 V | 20 KB | 200 cyc/KB | 20000 cyc/KB | 0.0100 | 128 KB | 80 C. | | | |
| B | C, E | A, D | 4 Ghz | 1.0 V | 50 KB | 1000 cyc/KB | 10 Kcyc/KB | 0.0042 | 128 KB | 70 C. | | | |
| C | Sink | B | 0.5 Ghz | 0.8 V | 90 KB | 20 cyc/KB | 400 cyc/KB | 0.0010 | 32 KB | 85 C. | | | |
| D | B | Source | 2 Ghz | 0.9 V | 25 KB | 140 cyc/KB | 800 cyc/KB | 0.0001 | 64 KB | 70 C. | | | |
| E | Sink | B | 2 Ghz | 0.9 V | 20 KB | 500 cyc/KB | 2000 cyc/KB | 0.0002 | 128 KB | 80 C. | | | |

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
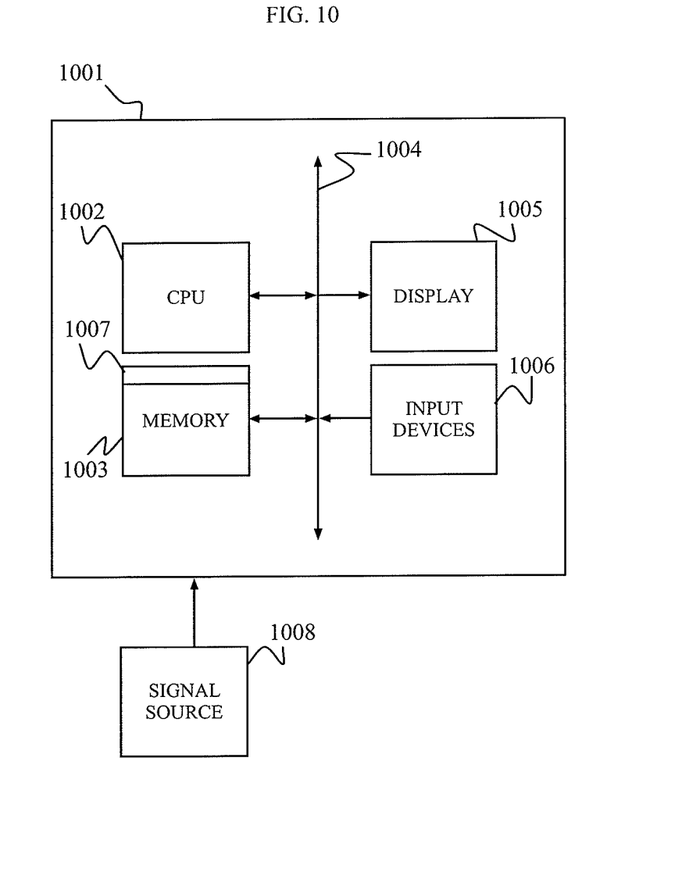
FIG. 10 is a system for executing a computer program product for controlling power and performance in a hybrid, multitasking microprocessor system, according to an embodiment of the present disclosure.

For example, referring to FIG. 10, according to an embodiment of the present disclosure, a computer system 1001 for controlling power and performance in a hybrid, multitasking microprocessor system can comprise, inter alia, a central processing unit (CPU) 1002, a memory 1003 and an input/output (I/O) interface 1004. The computer system 1001 is generally coupled through the I/O interface 1004 to a display 1005 and various input devices 1006 such as a mouse and keyboard. The support circuits can include circuits such as cache, power supplies, clock circuits, and a communications bus. The memory 1003 can include random access memory (RAM), read only memory (ROM), disk drive, tape drive, etc., or a combination thereof. The present invention can be implemented as a routine 1007 that is stored in memory 1003 and executed by the CPU 1002 to process the signal from the signal source 1008. As such, the computer system 1001 is a general-purpose computer system that becomes a specific purpose computer system when executing the routine 1007 of the present invention.

The computer platform 1001 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described embodiments for controlling power and performance in a hybrid, multitasking microprocessor system, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A method for controlling a multitasking microprocessor system, comprising:
    monitoring the multitasking microprocessor system connected to an interconnect, the monitoring comprising monitoring performance of a plurality of processing units forming a producer-consumer system on the interconnect;
    issuing commands to the plurality of processing units to provide operations and power distributions to the plurality of processing units such that the performance and power modes are assigned to the plurality of processing units based on the monitoring; and
    determining the operations and power distributions according to the performance of the plurality of processing units compared to a flow condition of the multitasking microprocessor system.

2. The method of claim 1, wherein the flow condition of the multitasking microprocessor system is a maximum feasible flow condition of the multitasking microprocessor system.

3. The method of claim 1, wherein the flow condition of the multitasking microprocessor system is a minimum feasible flow condition of the multitasking microprocessor system.

4. The method of claim 1, where each of the plurality of processing units has a unique set of processing capabilities.

5. The method of claim 1, wherein assigning includes determining an amount of a change in a resource for each of the plurality of processing units from a power-performance trade-off table.

6. A computer program product for controlling a multitasking microprocessor system, the computer program product comprising:
    a computer readable storage medium having computer readable program code embodied therewith, the computer readable program code comprising:
    computer readable program code configured to monitor the multitasking microprocessor system connected to an interconnect, the monitoring comprising monitoring performance of a plurality of processing units forming a producer-consumer system on the interconnect;
    computer readable program code configured to issue commands to the plurality of processing units to provide operations and power distributions to the plurality of processing units such that the performance and power modes are assigned to the plurality of processing units based on the monitoring; and
    computer readable program code configured to determine the operations and power distributions according to the performance of the plurality of processing units compared to a flow condition of the multitasking microprocessor system.

7. The computer program product of claim 6, wherein the flow condition of the multitasking microprocessor system is a maximum feasible flow condition of the multitasking microprocessor system.

8. The computer program product of claim 6, wherein the flow condition of the multitasking microprocessor system is a minimum feasible flow condition of the multitasking microprocessor system.

9. The computer program product of claim 6, where each of the plurality of processing units has a unique set of processing capabilities.

10. The computer program product of claim 6, wherein assigning includes determining an amount of a change in a resource for each of the plurality of processing units from a power-performance trade-off table.

* * * * *